July 2, 1968 R. H. CALLEN 3,390,537

ICE DISPENSING APPARATUS

Filed Oct. 20, 1966 2 Sheets-Sheet 1

Inventor
Robert H. Callen
by Roberts, Cushman & Grover
Att'ys

July 2, 1968   R. H. CALLEN   3,390,537
ICE DISPENSING APPARATUS
Filed Oct. 20, 1966   2 Sheets-Sheet 2

United States Patent Office 3,390,537
Patented July 2, 1968

3,390,537
ICE DISPENSING APPARATUS
Robert H. Callen, Peabody, Mass., assignor to Market Forge Company, Everett, Mass., a corporation of Massachusetts
Filed Oct. 20, 1966, Ser. No. 588,204
17 Claims. (Cl. 62—62)

ABSTRACT OF THE DISCLOSURE

Ice storage and dispensing apparatus comprising a chamber for holding a layer of ice particles floating in water maintained at approximately freezing temperature, a conveyor embodying a plurality of spaced scoops movable into the chamber to scoop up ice particles from the layer and carry them from the chamber to the upper end of a chute into which the ice particles are dumped, a gate at the lower end of the chute, and means operable to advance the conveyor each time its operation is initiated a distance corresponding to the distance between scoops, open the gate to permit discharge of the ice particles, and then stop the conveyor.

---

The principal objects of the invention are to provide apparatus for storage of ice particles without the latter becoming congealed; to provide apparatus in which the storage may be maintained without substantial loss of the ice volume and without the ice acquiring a stale taste; to provide apparatus in which the ice particles are freely mobile in storage and easily collectable for dispensing from storage; to provide apparatus designed to dispense a predetermined quantity of ice particles each time ice is needed; and to provide apparatus which is efficient, reliable and inexpensive to operate.

The term "ice particles" used herein is intended to cover any and all forms of ice of such size as to be useful for the purposes mentioned above whether crushed or formed.

As herein illustrated, the invention comprises, in combination, a bin situated below a counter top or bar for holding a quantity of ice particles suspended in a fluid, a conveyor supported with a portion submerged in the fluid operable to raise the floating ice particles from the bin to a dispensing head located on the counter top or bar for discharge free from the sustaining fluid, and means for effecting operation of the conveyor each time a quantity of ice is wanted to deliver a predetermined quantity to the dispensing head. The fluid employed is water, maintained in a liquid state at approximately 32° by cooling coils situated in the bin which absorb the heat from the fluid or by ice supplied in sufficient quantity to bring the water temperature down to 32°, and by thermal insulation applied to the walls of the bin. A float valve and overflow pipe in combination keep the level of the ice and water mixture at a predetermined level with respect to the lower end of the conveyor which, as employed herein, is an endless belt supported with its lower end submerged in the fluid and having on it a plurality of spaced baskets. The baskets are moved in succession from the bin to the dispensing head and back to the bin and during their passage through the ice and water layer each basket scoops up a quantity of ice particles. The dispensing head contains a discharge opening near the top of the conveyor and at the descending side of the belt there is a tray sloping toward the opening on which the ice particles are dumped when the baskets commence their descent. A trap door normally closes the opening and is opened substantially simultaneously with the deposit of the ice on the tray to discharge the ice into a vessel held below the trap door. Lugs on the belt effect opening of the trap door and also terminate operation of the conveyor. The conveyor is started by an activator located on the dispensing head below the trap door which, when pressed by holding a vessel against it, closes a normally open switch to start a motor which drives the conveyor. The floating ice particles are maintained close to and concentrated about the lower end of the conveyor by a pump arranged to effect circulation of the water in a direction counter to the movement of the baskets through the ice and water layer, and baffles for confining the flow to the immediate vicinity of the lower end of the conveyor. The pump may or may not be situated in the bin. Discharge and intake pipes are connected to the pump, each having a nozzle located in the ice and water layer so that the discharge from the pump produces flow toward the lower end of the conveyor and the intake from the pump produces flow away from the lower end of the conveyor. Optionally, the conveyor may be a drum having a plurality of baskets fixed to its periphery, supported with its lower portion in the bin and with its upper portion within a suitably shaped dispensing head.

The invention will now be described in greater detail with reference to the accompanying drawings wherein:

FIG. 2b is a fragmentary view, to larger scale, taken on the line 2b—2b of FIG. 2a;

FIG. 2c is a fragmentary view taken on the line 2c—2c of FIG. 2a;

Figure 1:
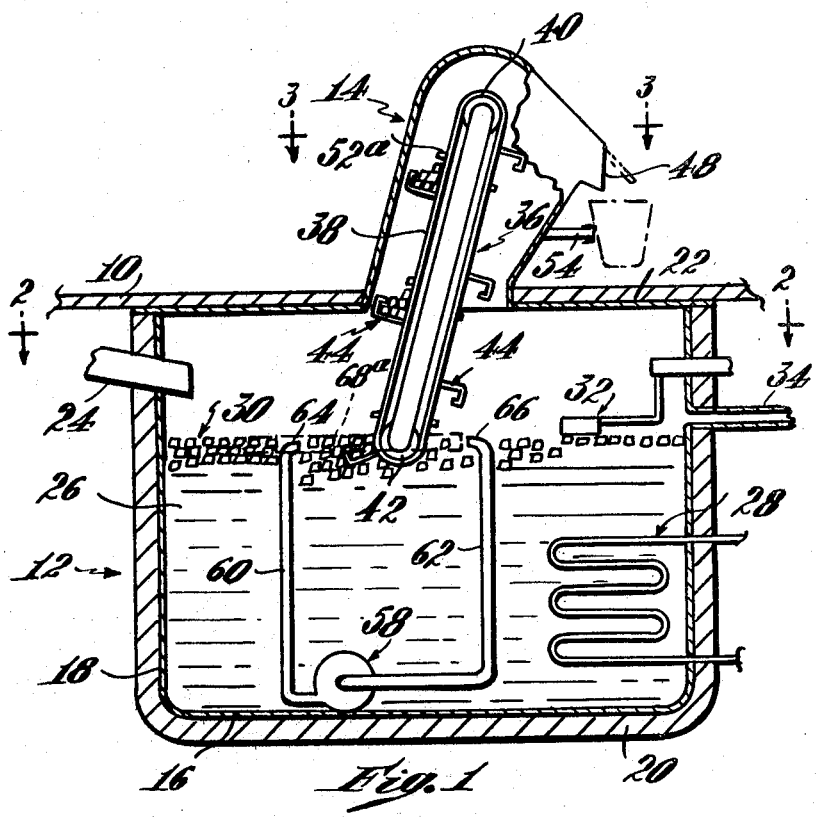
FIG. 1 is an elevation, partly in section, showing the ice dispensing apparatus associated with a bar-top counter, such as is generally available at a refreshment stand, restaurant, night club, or the counter top in a kitchen.

Referring to the drawings (FIG. 1) there is shown a horizontal counter top 10 with which the storage and dispensing apparatus is associated, storage being provided by a bin 12 located below the counter and dispensing being provided by a dispensing head 14 mounted on the counter, and a conveyor having portions in the storage bin and in the dispensing head for transferring ice particles from the bin to the head for discharge into a receptacle held up to a discharge opening in the housing as will appear hereinafter.

The bin 12 is of rectangular cross-section having a bottom 16 and side walls 18 comprised of sheet metal covered with a layer of thermal insulation 20. The top of the bin is held against and thus closed by the counter 10, although it is to be understood that the top may be provided with an independent closure 22 of sheet metal so that the unit, as a whole, may be installed without regard to the particular type of bar top available.

The bin is provided with a duct 24 through which ice particles of the desired kind may be introduced into the bin, for example, from a suitable ice making machine. In accordance with the invention the ice particles are discharged into the bin into water 26 maintained at a temperature of approximately 32° F. by means of a coil 28 supported in the bin through which a refrigerant is constantly circulated for the purpose of absorbing heat from the water and by such absorption holding the temperature at the aforementioned level without freezing. Optionally the coils 28 may be omitted and the temperature of the water reduced by supplying an excess of ice. The ice particles, as shown in FIG. 1, float on the surface of the water forming a relatively thick layer 30 of ice and water mixture in which each individual particle of ice is enveloped in a film of water so that it remains freely mobile in storage, thus eliminating the problem of congealing of particles which is the chief fault of ice storage apparatus. The level of the ice and water mixture is maintained by a sensing element 32 in the form of a float which operates a switch in the circuit of the ice making machine so as to stop the ice making machine and hence discharge of ice through the conductor 24 when the ice and water mixture reaches the level of the float as indicated in FIG. 1. An overflow pipe 34 provides for carrying away the excess water; the float and overflow pipe collectively maintain a relatively uniform level.

The dispensing head 14 (FIG. 1) as previously mentioned is mounted on the counter top or may be mounted on the cover 22 and extends through an opening in the counter top and comprises a sheet metal housing of suitable attractiveness containing the upper portion of a conveyor 36, the lower portion of which extends into the bin and is submerged in the ice and water layer 30. The conveyor comprises an endless belt 38 entrained about a pulley 40 within the dispensing head and a pulley 42 within the bin in a somewhat inclined position. The belt has on it a plurality of basket structures 44, each of which comprises a plurality of spaced parallel wires of L-shaped configuration fixed to the belt so as to project at right angles therefrom and so that the ascending baskets are right side up and the descending baskets are inverted. As arranged, the descending baskets enter the layer of ice and water with their open sides leading and as they pass around the lower pulley 42 they scoop up ice and carry it upwardly for discharge. When the ascending baskets reach the pulley 40 and pass over it, they invert and deposit the ice on a sloping tray 46. The tray 46 is located at the descending side of the conveyor and forms the bottom of a discharge passage, the open end of which is normally covered by a trap door 48 hinged at the top and held closed by a spring 50. The trap door is opened automatically, substantially simultaneously with the dumping of the ice from a basket onto the tray 46 by a lug 52a fixed to the endless belt, one of which is provided for each basket and is located ahead of the basket on the belt. As each lug 52a passes over the upper pulley 40 it engages an arm 2 which is mechanically connected to an arm 3 through a torsion spring 4. Both arms and spring pivot about a stud 5. The lug rotates the arm 2 about the stud 5 and in turn rotates the arm 3 through the torsion spring until the trap door is fully opened. Further movement of the lug 52a against the arm 2 twists the torsion spring until the lug slips past the end of the arm 2 whereupon the trap door closes due to the torsion exerted by the tension spring and the arms 2 and 3 rotate back to their original position.

Figure 3:
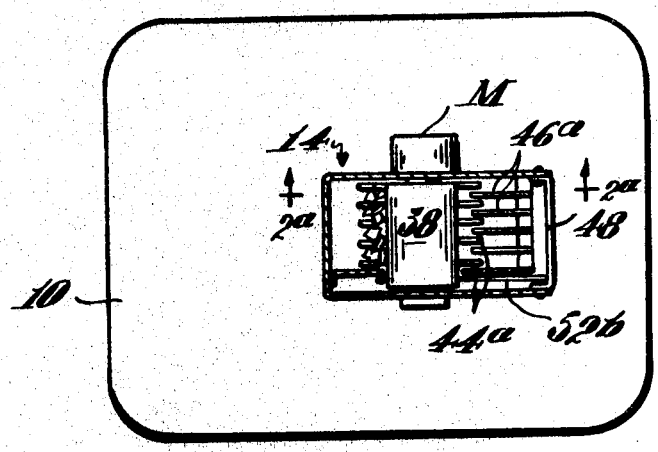
FIG. 3 is a plan view taken on the line 3—3 of FIG. 1, with the housing of the dispenser head shown in section.

As related above, each basket 44 comprises a plurality of spaced parallel wires 44a. The tray 46 is also comprised of spaced parallel wires 46a (FIG. 3) which are supported in alternate relation to the wires of the baskets so that the baskets pass through the tray, leaving the ice on the surface thereof.

Figure 2:
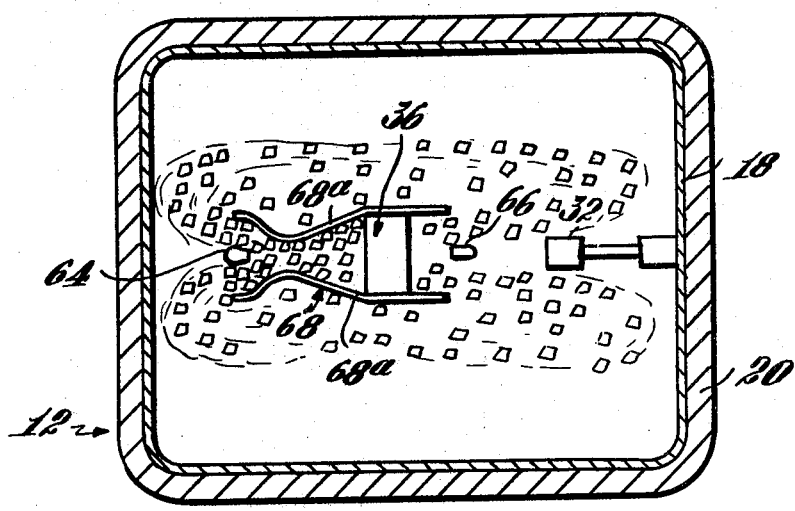
FIG. 2 is a horizontal section taken on the line 2—2 of FIG. 1.
Figure 2A:
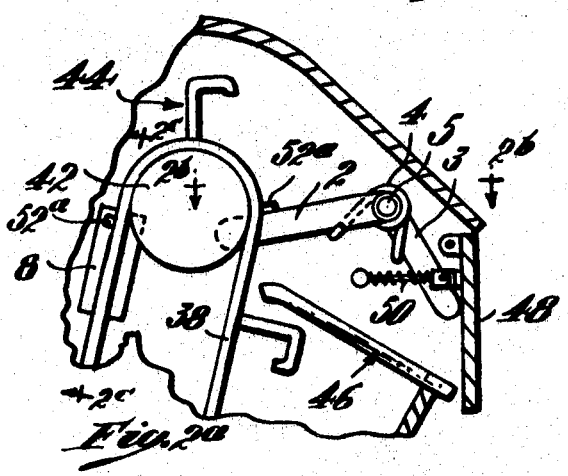
FIG. 2a is a fragmentary view, to larger scale, taken on the line 2a—2a of FIG. 3.
Figure 2B:
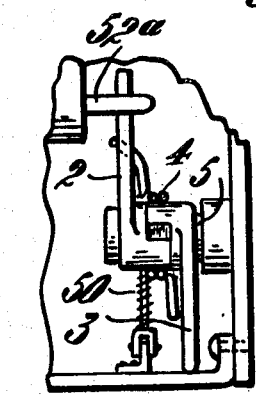
Figure 2C:
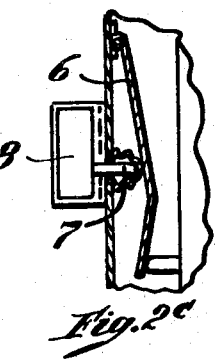

Normally, when the apparatus is idle the trap door 48 is closed. An actuator 54 is provided just below the trap door which is operated by pressure, for example, by placing a receptacle against it and pushing to close a normally open switch in the operating circuit of the apparatus to start the conveyor motor M. The conveyor will move a distance corresponding to the distance between successive baskets so as to dump ice from the uppermost basket at the descending side of the conveyor onto the tray. At the point where the trap door is closed the subsequent lug 52a comes into contact with a hinged bar 6 (FIG. 2a) and depresses it which in turn causes depression of an actuator pin 7 of a switch 8 which stops the motor M driving the conveyor.

In order to insure filling each basket 44, as it moves through the layer 30 of ice and water, it is desirable to provide circulation, that is movement of the ice particles toward the lower part of the conveyor. To accomplish this a pump 58 is provided which may be mounted in the bin or out of the bin, having a discharge conduit 60 and an intake conduit 62 provided with nozzles 64 and 66 located in the ice and water layer at opposite sides of the lower end of the conveyor so as to produce a flow of water and hence movement of the ice from left to right as shown in FIG. 1. This movement maintains a concentration of ice particles at the point where the baskets are moving upwardly out of the layer so that they will pick up ice. In order to confine the flow to the immediate vicinity of the lower end of the conveyor, a baffle 68 (FIG. 2) is supported in the ice and water layer which provides a passage at the lower end of the conveyor into which the ice particles floating on the water enter and are conducted toward the baskets passing around the lower end of the pulley 42. The baffle comprises transversely spaced members 68a which are shaped to provide a relatively wide mouth into which the particles are drawn, a relatively narrow throat through which the particles are forced and which concentrates the particles, and a relatively wide gate in which the lower end of the conveyor is situated. The throat provides a Venturi or aspirating effect which assures relatively uniform flow.

Figure 4:
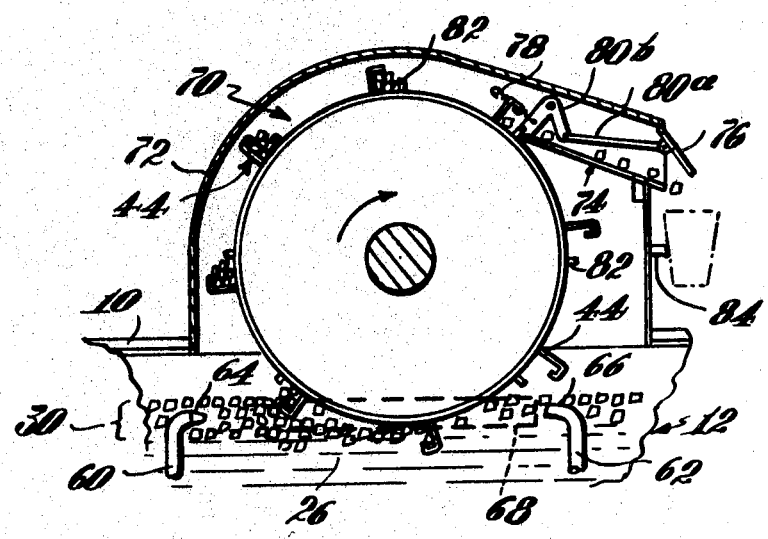
FIG. 4 is an elevation, partly in section, of a modified form of the invention.

A modified form of conveyor is illustrated in FIG. 4 in which the endless belt-type conveyor is replaced by a drum 70 supported for rotation with its lower part submerged in the ice and water layer 30 in the bin 12 and its upper part extending upwardly through the counter 10 into a dispensing housing 72 shaped to accommodate it. The housing is provided with a discharge tray 74, a trap door 76 normally held closed by a spring 78, and means for opening the trap door comprising a rod 80a connected thereto, a bell-crank lever 80b connected to the rod, and pins 82 on the drum which, by engagement with an arm of the bell-crank lever open the trap door substantially at the moment that the ice is dumped on the tray. An actuator 84 is provided for starting the apparatus to effect rotation of the drum 70 a distance corresponding to the distance between successive baskets so as to dump one basket of ice on the tray. In other respects, the modification of the apparatus is identical with that previously described.

The principal advantage of the apparatus in either of its forms is that the ice particles are held in free mobile suspension in water so that there is no possibility of congealing of the particles of ice; that they are maintained fresh, without loss of volume; and are easily dispensable.

It should be understood that the present disclosure is for the purpose of illustration only and that this invention includes all modifications and equivalents which fall within the scope of the appended claims.

I claim:

1. Particulate ice storage and dispensing apparatus comprising a storage chamber for holding a quantity of ice particles floating in a layer on water contained by the chamber substantially at the freezing point of the water, said particles in said layer being enveloped in a liquid film such that they will not congeal while they continue to float, a conveyor supported on the chamber embodying a plurality of spaced scoops adapted to be moved through a predetermined path, a portion of which passes downwardly through the layer of ice particles floating in the water, then upwardly through the layer so as to lift a quantity of particles from the chamber and finally to a place of discharge where inversion of the scoop dumps the ice particles, an inclined chute disposed with its upper end adjacent the place of discharge for receiving the ice particles dumped from the scoop, a gate at the lower end of the chute, and means operable, by placing a receptacle in adjacency thereto for receiving a charge of ice particles to effect movement of the conveyor a distance corresponding to the distance between scoops and simultaneously to open the gate.

2. Apparatus according to claim 1, wherein there is a float valve and overflow pipe cooperable to maintain the level of the fluid and/or ice at a predetermined level.

3. Apparatus according to claim 1, wherein the conveyor comprises an endless member supported with a movable in succession into and out of the bin, each basket as it emerges from the fluid lifting a quantity of ice particles therefrom and each basket at a predetermined position discharging the ice particles.

4. Apparatus according to claim 1, wherein the conveyor comprises an endless member supported with a portion submerged in the fluid and a portion extending from the chamber to said place of discharge, and said scoops comprising perforate baskets supported on the endless member at spaced intervals movable by the endless member successively into the fluid and out again to lift a quantity of ice particles therefrom, said baskets effecting discharge by inversion as they change direction from their movement away from the chamber to their movement toward the chamber.

5. Apparatus according to claim 1, wherein the conveyor comprises an endless belt supported on spaced pulleys located above the chamber and within the chamber below the level of the fluid, said scoops being secured to the belt so that they are upright when moving away from the submerged and inverted when they move toward the submerged pulley, said scoops changing position as they pass over the pulley located above the chamber.

6. Apparatus according to claim 1, wherein the inclined chute has a bottom which is perforate, a gate, and means operable by the conveyor to open the gate as the scoop approaches the chute.

7. Apparatus according to claim 4, wherein said baskets and chute embody alternately arranged bars so that the bars of each basket pass through the bars of the chute after it dumps its load on the chute, and a gate at the lower end of the chute operable to release the ice from the chute.

8. Apparatus according to claim 1, wherein a watertight housing encloses the portion of the conveyor extending from the chamber, said housing containing a discharge opening, and said gate covers the discharge opening.

9. Apparatus according to claim 1, wherein the conveyor is a wheel supported with its lower portion within the chamber below the surface of fluid therein and its upper portion above the chamber and enclosed within a water-tight housing, and said scoops are attached at spaced intervals to its periphery.

10. Apparatus according to claim 1, comprising means for effecting continuous circulation of the water and floating ice toward the submerged portion of the conveyor.

11. Apparatus according to claim 1, wherein the scoops travel in a direction to scoop the ice from the water, and there is means for circulating the water in a direction toward the scoops as they travel through the layer of ice.

12. Apparatus according to claim 4, wherein the baskets travel through the layer of ice and there is a pump operable to produce movement of the fluid in a direction opposite to that of the movement of the baskets as they travel through the layer of ice.

13. Apparatus according to claim 4, wherein the baskets travel through the layer of ice, there are discharge and intake pipes located in the fluid ice layer at the ingoing and outgoing sides of the baskets, and there is a pump operable to discharge water from the discharge pipe toward the submerged portion of the conveyor and take in water into the intake pipe at the opposite side of the conveyor to maintain a flow of water and ice counter to the movement of the baskets.

14. Apparatus according to claim 1, wherein there are baffles supported in a water ice layer adjacent the submerged portion of the conveyor.

15. Apparatus according to claim 4, wherein there is a pump for effecting circulation of the water in a direction counter to the direction of movement of the baskets through the ice layer, and baffles for maintaining the flow of ice substantially at the level of the baskets.

16. Particulate ice storage and dispensing apparatus comprising a storage chamber for holding a quantity of ice particles floating in a layer in water contained by the chamber substantially at the freezing point of the water, said ice particles in said layer being enveloped in a liquid film such that they will not congeal while they continue to float, a conveyor supported on the chamber embodying a plurality of spaced scoops adapted to be moved through a predetermined path, a portion of which passes downwardly through the layer of ice particles floating in the water and upwardly through the layer so as to lift a quantity of ice particles from the chamber, and finally to a place of discharge where inversion of the scoops dumps the ice particles, an inclined chute disposed with its upper end adjacent the place of discharge for receiving the ice particles dumped from the scoop, a gate at the lower end of the chute, and means operable by the conveyor, as it dumps ice from the scoop onto the chute, to stop the conveyor.

17. The method of storing ice particles for dispensing in particulate form comprising the steps of: floating the ice particles in a loosely associated layer in a fluid medium, maintaining the fluid medium at approximately 32° F., supporting the lower end of a conveyor in the ice and water layer, providing a narrow passage in the ice and water layer adjacent the lower end of the conveyor, effecting a flow of ice and water mixture through said passage toward the side of the conveyor ascending from the ice and water layer and away from the opposite side of the conveyor and removing ice with the conveyor in predetermined quantities.

References Cited

UNITED STATES PATENTS

| | | | |
|---|---|---|---|
| 1,397,615 | 11/1921 | Bassett | 221—83 |
| 1,453,923 | 5/1923 | De Young | 222—371 X |
| 1,940,005 | 12/1933 | McKee et al. | 221—83 |
| 2,349,451 | 5/1944 | Motz | 62—344 X |
| 2,544,394 | 3/1951 | Muffly. | |
| 2,695,502 | 11/1954 | Muffly | 62—344 X |
| 3,192,734 | 7/1965 | Swanson | 62—344 X |

ROBERT A. O'LEARY, *Primary Examiner.*

W. E. WAYNER, *Assistant Examiner.*